United States Patent
Ge et al.

(10) Patent No.: US 10,872,585 B2
(45) Date of Patent: Dec. 22, 2020

(54) DISPLAY METHOD AND TERMINAL

(71) Applicant: Huawei Technologies Co., Ltd., Shenzhen (CN)

(72) Inventors: Xiazhi Ge, Shenzhen (CN); Hui Yi, Wuhan (CN); Zhili Gu, Wuhan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/070,019

(22) PCT Filed: Jan. 15, 2016

(86) PCT No.: PCT/CN2016/071053
§ 371 (c)(1),
(2) Date: Jul. 13, 2018

(87) PCT Pub. No.: WO2017/120894
PCT Pub. Date: Jul. 20, 2017

(65) Prior Publication Data
US 2019/0019476 A1   Jan. 17, 2019

(51) Int. Cl.
*G09G 5/38* (2006.01)
*G06F 3/048* (2013.01)
(Continued)

(52) U.S. Cl.
CPC .............. *G09G 5/38* (2013.01); *G06F 1/1626* (2013.01); *G06F 3/048* (2013.01); *G06F 3/0481* (2013.01);
(Continued)

(58) Field of Classification Search
CPC ....... G09G 5/38; G09G 5/373; G06F 3/04845
See application file for complete search history.

(56) References Cited

U.S. PATENT DOCUMENTS 9,043,714 B1    5/2015  Queru
2012/0002853 A1*  1/2012  Omernick ............. G06F 19/321
                                        382/128
(Continued)

FOREIGN PATENT DOCUMENTS

CN    101834938 A    9/2010
CN    102710835 A    10/2012
(Continued)

OTHER PUBLICATIONS

Stack Overflow, "How to set an entire application in portrait mode only?", last edited: Jun. 9, 2015 (https://stackoverflow.com/questions/6745797/how-to-set-entire-application-in-portrait-mode-only) (pp. 1-8).*

*Primary Examiner* — Sarah Lhymn
(74) *Attorney, Agent, or Firm* — Slater Matsil, LLP

(57) ABSTRACT

A method includes receiving an instruction for switching display orientation of a screen from a first display orientation to a second display orientation, and obtaining display orientation configuration information of page display of an application currently displayed on the screen. The method also includes modifying the display orientation configuration information and a page display size of the application, when the display orientation configuration information sets that the application supports only display in the first display orientation. The method also includes switching the display orientation of the screen according to the instruction, and displaying the application with the modified page display size on the screen after the display orientation of the application is switched from the first display orientation to the second display orientation.

18 Claims, 9 Drawing Sheets

(51) Int. Cl.
  *G06F 1/16* (2006.01)
  *G06F 3/0488* (2013.01)
  *G06F 3/0481* (2013.01)
  *G06F 3/0484* (2013.01)
  *G09G 5/373* (2006.01)

(52) U.S. Cl.
  CPC ...... *G06F 3/04845* (2013.01); *G06F 3/04886* (2013.01); *G09G 5/373* (2013.01); *G06F 2200/1614* (2013.01); *G06F 2203/04803* (2013.01); *G09G 2340/0492* (2013.01); *G09G 2354/00* (2013.01)

(56) References Cited

U.S. PATENT DOCUMENTS

| | | | |
|---|---|---|---|
| 2012/0081270 A1* | 4/2012 | Gimpl | G06F 1/1616 345/1.3 |
| 2012/0198344 A1* | 8/2012 | Tukol | G06F 9/4416 715/735 |
| 2013/0021377 A1* | 1/2013 | Doll | G09G 5/14 345/649 |
| 2013/0227469 A1 | 8/2013 | Park | |
| 2014/0282055 A1* | 9/2014 | Engel | G06F 3/0482 715/744 |
| 2015/0042821 A1 | 2/2015 | Hung | |
| 2016/0033999 A1* | 2/2016 | Browning | G06F 1/1652 345/667 |

FOREIGN PATENT DOCUMENTS

| | | |
|---|---|---|
| CN | 103853347 A | 6/2014 |
| CN | 103955324 A | 7/2014 |
| CN | 104035662 A | 9/2014 |
| CN | 104345872 A | 2/2015 |
| CN | 104348978 A | 2/2015 |
| CN | 104898920 A | 9/2015 |
| CN | 104978115 A | 10/2015 |
| CN | 104991723 A | 10/2015 |
| EP | 2887686 A1 | 6/2015 |
| JP | 2014149860 A * | 8/2014 |
| JP | 2014149860 A | 8/2014 |

\* cited by examiner

DISPLAY METHOD AND TERMINAL

CROSS-REFERENCE TO RELATED APPLICATIONS

This application is a national stage of International Application No. PCT/CN2016/071053, filed on Jan. 15, 2016, which application is hereby incorporated by reference in its entirety.

TECHNICAL FIELD

The present invention relates to the field of communications technologies, and in particular, to a display method and a terminal.

BACKGROUND

As terminals such as a mobile phone and a tablet computer become more intelligent, they can help people a lot in life, work, learning, and entertainment. Generally, a height and a width of a display screen of a terminal are different. Therefore, the terminal usually has two display orientations: a landscape orientation and a portrait orientation. As shown in FIG. 1, when a horizontal width displayed by the terminal is less than a vertical height, it indicates the portrait orientation; and when the horizontal width displayed by the terminal is greater than the vertical height, it indicates the landscape orientation. If an application supports landscape/portrait orientation rotation, when the terminal rotates, the application accordingly changes a display orientation. If the application has a dedicated resource, such as a layout or a picture, of the landscape orientation or the portrait orientation, a landscape orientation resource is preferably loaded in the landscape orientation, and a portrait orientation resource is preferably loaded in the portrait orientation. If the application is limited to portrait orientation display, when the terminal rotates to landscape orientation display, the display orientation of the application is still the portrait orientation and does not change with the rotation of the terminal. Likewise, if the application is limited to the landscape orientation display, when the terminal rotates to the portrait orientation display, the display orientation of the application is still the landscape orientation and does not change with the rotation of the terminal.

Due to diversity of terminal vendors and terminal configurations, at present, many third party applications do not provide a switchable display version for a landscape/portrait orientation of the application, and no mobile phone or tablet computer vendor provides a mandatory landscape/portrait orientation switching mode for a terminal. Consequently, a user cannot flexibly perform landscape/portrait orientation switching according to a demand of the user to conveniently use these applications. This affects a display effect and user experience of the terminal.

SUMMARY

A technical problem to be resolved in embodiments of the present invention is to provide a display method and a terminal, so as to resolve a problem that a display effect and user experience of a terminal are relatively poor because an application does not support landscape/portrait orientation switching.

According to a first aspect, an embodiment of the present invention provides a display method, including:

receiving a landscape/portrait orientation switching instruction;

reading a display attribute of a currently displayed application and obtaining, according to the display attribute, landscape/portrait orientation configuration information of page display of the application;

if the landscape/portrait orientation configuration information sets that a page supports only display in a single orientation, modifying the landscape/portrait orientation configuration information and a page display size of the application;

performing landscape/portrait orientation switching according to the landscape/portrait orientation switching instruction; and displaying, on an interface obtained after landscape/portrait orientation switching, the application whose page display size is modified.

The display attribute of the application is read, and the landscape/portrait orientation configuration information of page display of the application is obtained. When the landscape/portrait orientation switching instruction is received, if the landscape/portrait orientation configuration information sets that the page supports only display in a single orientation, the landscape/portrait orientation configuration information and the page display size of the application are modified, and landscape/portrait orientation switching is performed according to the landscape/portrait orientation switching instruction. The application whose page display size is modified is displayed on the interface obtained after landscape/portrait orientation switching. Therefore, an application that does not support landscape/portrait orientation switching can implement landscape/portrait orientation switching display. Especially when a user uses a terminal with a relatively large screen, landscape orientation display may be implemented according to a demand of the user, and a wider landscape vision is provided for the user. When it is inconvenient for the user to operate the terminal with two hands, portrait orientation display may be implemented according to a demand of the user, and the user can conveniently operate the terminal with one hand. Therefore, a display effect and user experience of the terminal are improved, and applicability and practicability of the terminal are extended.

With reference to the first aspect, in a first possible implementation of the first aspect, the method further includes:

the interface obtained after landscape/portrait orientation switching includes a first display area and a second display area, and the method further includes:

displaying the application in the first display area; and displaying a preset function button or a preset application in the second display area.

The preset function button or the preset application is displayed in the second display area obtained after landscape/portrait orientation switching, so that a screen hardware resource of the terminal is fully utilized and more functions for a display page obtained after landscape/portrait orientation switching are provided. This is more convenient for the user to use the terminal, and the applicability and the practicability of the terminal are further improved.

With reference to the first aspect or with reference to the first possible implementation of the first aspect, in a second possible implementation of the first aspect, the method further includes:

recording modified landscape/portrait orientation configuration information and a modified page display size during landscape/portrait orientation switching of the application, so that the landscape/portrait orientation configuration information and the page display size can be invoked when landscape/portrait orientation switching is performed again.

After the modified landscape/portrait orientation configuration information and the modified page display size are recorded, the landscape/portrait orientation configuration information and the page display size can be directly invoked when the terminal performs landscape/portrait orientation switching again. This can avoid inefficient processing that the landscape/portrait orientation configuration information and the page display size need to be modified once every time, and can increase a response speed of landscape/portrait orientation switching.

With reference to the first aspect or with reference to the first or the second possible implementation of the first aspect, in a third possible implementation of the first aspect, when the application is switched from portrait orientation display to landscape orientation display, the modifying a page display size of the application includes:

configuring a page display width when the application is displayed in a landscape orientation as a page display width when the application is displayed in a portrait orientation and configuring a page display height when the application is displayed in the landscape orientation to be less than or equal to the page display width when the application is displayed in the portrait orientation.

Such a size configuration can ensure that page display precision is not changed, and can avoid a problem that user experience becomes worse because the page becomes rough and fuzzy.

With reference to any one of the first aspect or the first to the third possible implementations of the first aspect, in a fourth possible implementation of the first aspect, when the application is switched from the portrait orientation display to the landscape orientation display, the application is displayed in a center or on a right side of a display screen of a terminal.

Most users are used to using their right hands. Therefore, the page displayed in the landscape orientation is displayed in the center or on the right side of the display screen of the terminal. This not only accords with a visual habit of the user, but also accords with an operating habit of the user, and makes it convenient for the user to view and use the page displayed in the landscape orientation.

With reference to any one of the first to the fourth possible implementations of the first aspect, in a fifth possible implementation of the first aspect, the displaying a preset function button or a preset application in the second display area includes:

displaying, in the second display area, an application or a function button related to the application; or displaying, in the second display area, an application or a function button that is adapted to all applications.

The application or the function button related to the application is displayed in the second display area obtained after landscape/portrait orientation switching, so that a function of the application is improved and it is more convenient for the user to use the current application. The application or the function button that is adapted to all applications is displayed in the second display area obtained after landscape/portrait orientation switching, so as to avoid wasting the screen hardware resource and enrich page functions displayed on the screen.

According to a second aspect, an embodiment of the present invention provides a terminal, including:

a receiving unit, configured to receive a landscape/portrait orientation switching instruction;

a reading unit, configured to read a display attribute of a currently displayed application and obtain, according to the display attribute, landscape/portrait orientation configuration information of page display of the application;

a modification unit, configured to: if the landscape/portrait orientation configuration information sets that a page supports only display in a single orientation, modify the landscape/portrait orientation configuration information and a page display size of the application;

a switch unit, configured to perform landscape/portrait orientation switching according to the landscape/portrait orientation switching instruction; and a display unit, configured to display, on an interface obtained after landscape/portrait orientation switching, the application whose page display size is modified.

With reference to the second aspect, in a first possible implementation of the second aspect, the interface obtained after landscape/portrait orientation switching includes a first display area and a second display area, and the display unit is further configured to: display the application in the first display area; and display a preset function button or a preset application in the second display area.

With reference to the second aspect or with reference to the first possible implementation of the second aspect, in a second possible implementation of the second aspect, the terminal further includes:

a recording unit, configured to record modified landscape/portrait orientation configuration information and a modified page display size during landscape/portrait orientation switching of the application, so that the display unit can invoke the landscape/portrait orientation configuration information and the page display size when landscape/portrait orientation switching is performed again.

With reference to the second aspect or with reference to the first or the second possible implementation of the second aspect, in a third possible implementation of the second aspect, when the application is switched from portrait orientation display to landscape orientation display, the modification unit is specifically configured to:

configure a page display width when the application is displayed in a landscape orientation as a page display width when the application is displayed in a portrait orientation and configure a page display height when the application is displayed in the landscape orientation to be less than or equal to the page display width when the application is displayed in the portrait orientation.

With reference to any one of the second aspect or the first to the third possible implementations of the second aspect, in a fourth possible implementation of the second aspect, when the application is switched from the portrait orientation display to the landscape orientation display, the display unit is further configured to display the application in a center or on a right side of a display screen of the terminal.

With reference to any one of the first to the fourth possible implementations of the second aspect, in a fifth possible implementation of the second aspect, the display unit is specifically configured to:

display, in the second display area, an application or a function button related to the application; or display, in the second display area, an application or a function button that is adapted to all applications.

According to a third aspect, an embodiment of the present invention provides a terminal, including:

a processor, a memory, a gravity sensor, a display screen, an interface circuit, and a bus, where the processor, the memory, the gravity sensor, the display screen, and the interface circuit are connected and communicate with each other by using the bus, the memory is configured to store a group of program code, and the processor is configured to invoke the program code stored in the memory, so as to perform the following operations:

receiving a landscape/portrait orientation switching instruction by using the gravity sensor or the interface circuit;

reading a display attribute of a currently displayed application and obtaining, according to the display attribute, landscape/portrait orientation configuration information of page display of the application;

if the landscape/portrait orientation configuration information sets that a page supports only display in a single orientation, modifying the landscape/portrait orientation configuration information and a page display size of the application;

performing landscape/portrait orientation switching according to the landscape/portrait orientation switching instruction; and instructing the display screen to display, on an interface obtained after landscape/portrait orientation switching, the application whose page display size is modified.

With reference to the third aspect, in a first possible implementation of the third aspect, the interface obtained after landscape/portrait orientation switching includes a first display area and a second display area, and the processor is further configured to:

instruct the display screen to display the application in the first display area; and instruct the display screen to display a preset function button or a preset application in the second display area.

With reference to the third aspect or with reference to the first possible implementation of the third aspect, in a second possible implementation of the third aspect, the processor is further configured to:

record, by using the memory, modified landscape/portrait orientation configuration information and a modified page display size during landscape/portrait orientation switching of the application, so that the landscape/portrait orientation configuration information and the page display size can be invoked when landscape/portrait orientation switching is performed again.

With reference to the third aspect or with reference to the first or the second possible implementation of the third aspect, in a third possible implementation of the third aspect, when the application is switched from portrait orientation display to landscape orientation display, the processor is specifically configured to:

configure a page display width when the application is displayed in a landscape orientation as a page display width when the application is displayed in a portrait orientation and configure a page display height when the application is displayed in the landscape orientation to be less than or equal to the page display width when the application is displayed in the portrait orientation.

With reference to any one of the third aspect or the first to the third possible implementations of the third aspect, in a fourth possible implementation of the third aspect, when the application is switched from the portrait orientation display to the landscape orientation display, the processor is specifically configured to:

instruct the display screen to display the application in a center or on a right side of the display screen of the terminal.

With reference to any one of the first to the fourth possible implementations of the third aspect, in a fifth possible implementation of the third aspect, the processor is specifically configured to:

instruct the display screen to display, in the second display area, an application or a function button related to the application; or instruct the display screen to display, in the second display area, an application or a function button that is adapted to all applications.

According to a fourth aspect, an embodiment of the present invention provides a computer storage medium, where the computer storage medium includes a group of program code, used to perform the method according to any one of the implementations of the first aspect of the embodiments of the present invention.

BRIEF DESCRIPTION OF THE DRAWINGS

To describe the technical solutions in the embodiments of the present invention or in the prior art more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
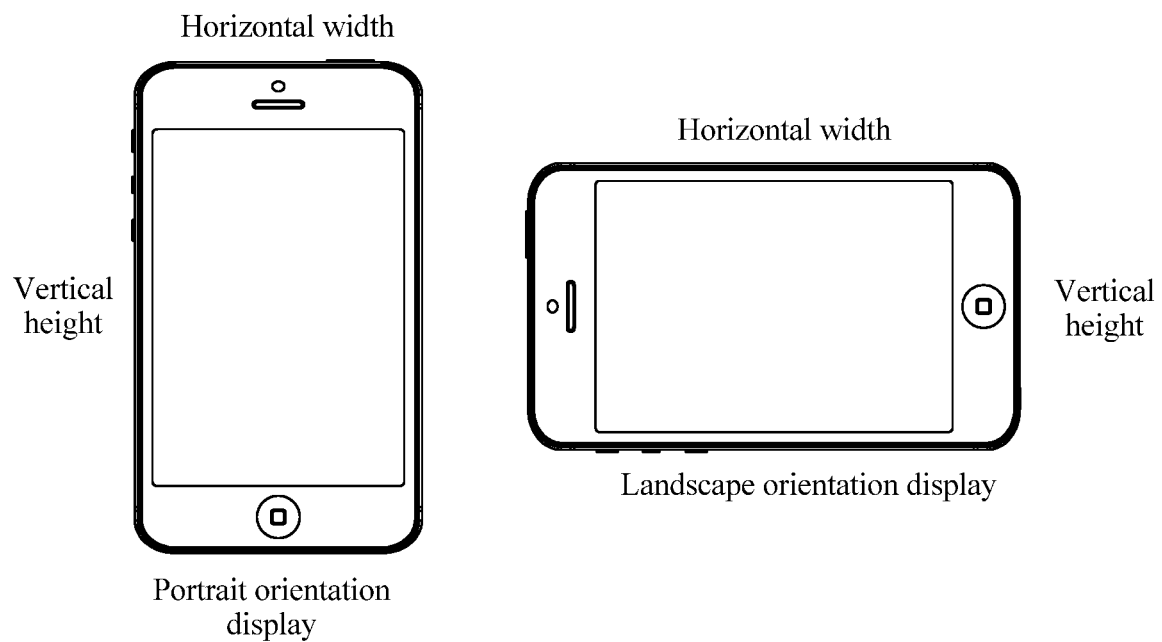
FIG. 1 is a schematic diagram of landscape orientation display and portrait orientation display of a terminal.
Figure 2:
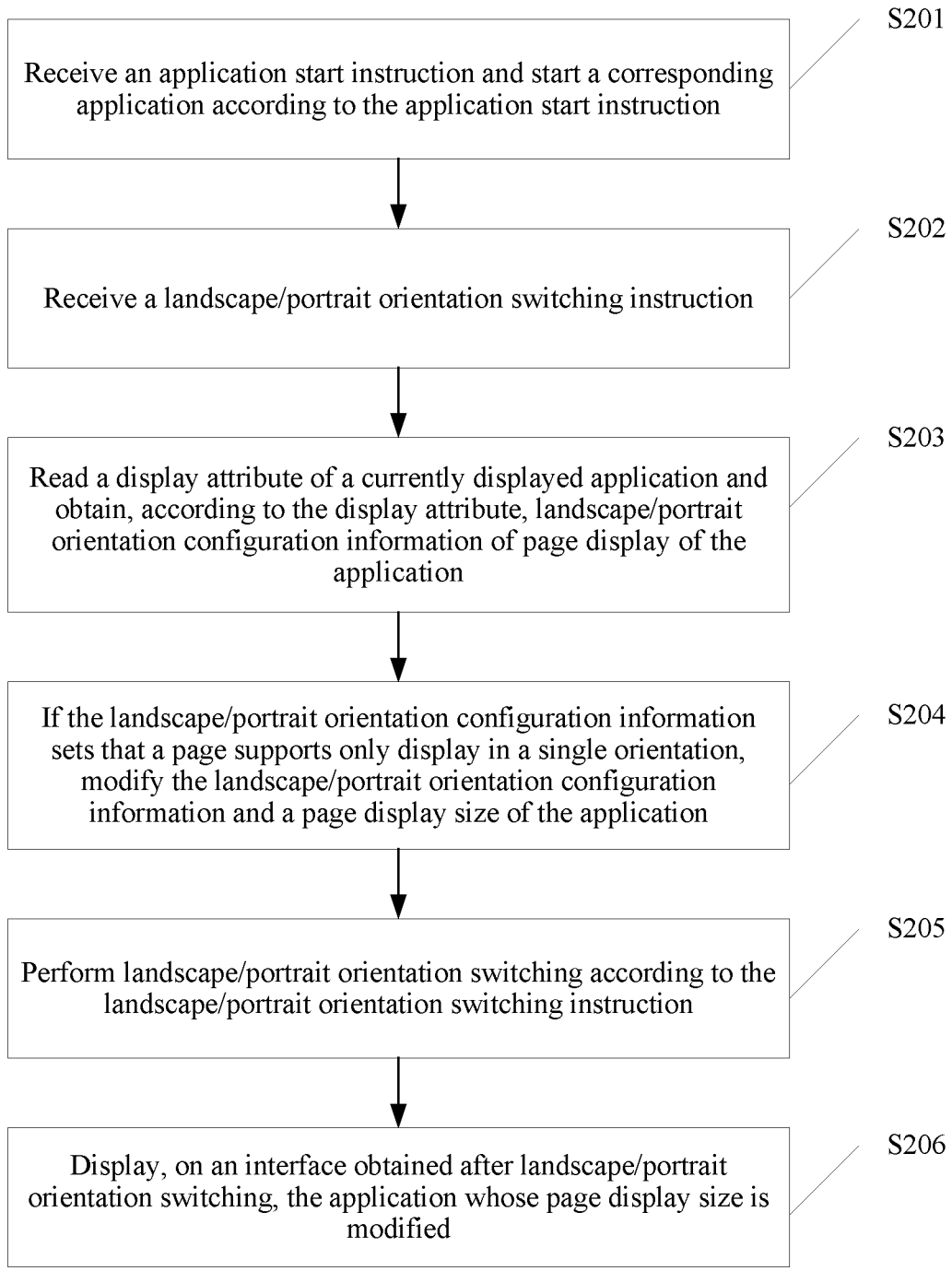
FIG. 2 is a schematic flowchart of a display method according to an embodiment of the present invention.

Referring to FIG. 2, FIG. 2 is a schematic flowchart of a display method according to an embodiment of the present invention. In this embodiment, the terminal may include but is not limited to a mobile phone, a tablet computer, a palmtop computer, a mobile Internet device (Mobile Internet Device, MID), a notebook, or a wearable device that supports screen rotation. The method includes the following steps.

S101. Receive an application start instruction and start a corresponding application according to the application start instruction.

S102. Receive a landscape/portrait orientation switching instruction.

S103. Read a display attribute of a currently displayed application and obtain, according to the display attribute, landscape/portrait orientation configuration information of page display of the application.

There may be or may not be a strict sequence between steps S102 and S103.

S104. If the landscape/portrait orientation configuration information sets that a page supports only display in a single orientation, modify the landscape/portrait orientation configuration information and a page display size of the application.

The page herein is a page generated by the currently displayed application. The display in a single orientation herein means that the page generated by the application supports only landscape orientation display or supports only portrait orientation display. Since the application sets that the page supports only display in a single orientation, the application may configure only display materials, such as a picture, an icon, and a button in a single orientation, such as the landscape orientation or the portrait orientation. When the page is switched to the other orientation, the materials originally limited to the single orientation may be extracted and modified to meet a display requirement in the other orientation. Modifying the page display size of the application herein may include but is not limited to modifying an overall size of the page, a size of an icon displayed on the page, and a size of a button displayed on the page. Certainly, it is possible that only the overall size of the page is modified, but the size of the specific icon or button is not modified, and the page is viewed by reducing a display quantity of the button or the icon in combination with page sliding.

S105. Perform landscape/portrait orientation switching according to the landscape/portrait orientation switching instruction.

S106. Display, on an interface obtained after landscape/portrait orientation switching, the application whose page display size is modified.

It should be noted that, for an interface before landscape/portrait orientation switching and the interface after landscape/portrait orientation switching, the interface before landscape/portrait orientation switching may be understood as a launcher, for example, a system standby interface of a mobile phone in a portrait state. In this case, if an application is run, such as WeChat, a running interface of WeChat is presented on a screen of the mobile phone. In this case, the running interface of WeChat occupies the entire screen, and a user cannot see the system standby interface. The interface after landscape/portrait orientation switching may also be understood as a launcher. A difference between the launcher and the launcher before landscape/portrait orientation switching lies in that display orientations are different, and display content may be the same or different. After landscape/portrait orientation switching, the running interface of WeChat may not occupy the entire screen, but occupies only a part of the screen. In this case, a part of the launcher may be seen.

Specifically, in step S101, in a possible implementation, the application runs after a start instruction entered by a user is obtained.

In another possible implementation, the application has run in a background. After an instruction entered by a user is obtained, the application runs on a current interface of the terminal according to the instruction. That is, the application is adjusted from the background to a foreground for running.

In still another possible implementation, the application in this embodiment may be a third party application, for example, software developed for a device, such as a mobile phone or a wristband. Generally, manufacturers develop software or preset an application at factory delivery. In this case, the software developed or preset by the manufactures is adjusted adaptively with landscape/portrait orientation switching of the terminal. Application software developed by numerous programming enthusiasts or organizations especially for a type of device is referred to as a third party application, for example, an application released in Apple Store or an application released in an Android market. A developer of the third party application may set landscape and portrait orientation display of the application when releasing an APK of the application. For example, the application is displayed only in a landscape state of a mobile phone, and a display orientation is not switched when the mobile phone is switched to a portrait state. For such a third party application, the method in this embodiment of the present invention may be used to bring a user higher visual experience.

Further, a solution of this embodiment of the present invention is applicable to all applications with a fixed display orientation, regardless of whether the application is a third party application. That is, if configuration information of an application determines that the application is displayed only in a landscape orientation or a portrait orientation, the configuration information of the application may be adjusted by using the method of this embodiment, so as to implement that a display orientation of the application is adjusted with landscape/portrait orientation switching of the mobile phone.

In step S102, after a system of the terminal is started, if an instruction for starting an application is received from a user, and the corresponding application is started, a display attribute of the application can be read, and landscape/portrait orientation configuration information of page display of the application can be obtained according to the display attribute. The display attribute herein includes but is not limited to the landscape/portrait orientation configuration information of page display, that is, a page display orientation and a page display size (usually covering an entire display screen of the terminal). If the landscape/portrait orientation configuration information of the application indicates that the application not only supports portrait orientation display, but also supports landscape orientation display, and a screen auto-rotation function of the terminal is enabled, the terminal may automatically switch landscape/portrait orientation display of the application according to a sensing signal of a gravity sensor. If the landscape/portrait orientation configuration information of the application indicates that the application supports landscape/portrait orientation switching, but the application may set that the page supports only portrait orientation display or landscape orientation display. Certainly, it is possible that the application has no landscape mode or portrait mode, and the page of the application can support only display in a single orientation. Therefore, the method in this embodiment may be used to perform landscape/portrait orientation switching.

In step S103, the received landscape/portrait orientation switching instruction may be generated by the gravity sensor when sensing rotation of the terminal, or generated when the user manually sets the display orientation.

In step S104, the terminal has obtained the landscape/portrait orientation configuration information of page display of the application. Therefore, a specific obtaining manner may be using a page configuration file of the application or invoking orientation code corresponding to the page. Then, it is determined whether the application has a limitation that the page supports only portrait orientation display or landscape orientation display. If the application has the limitation that the page supports only portrait orientation display or landscape orientation display, the limitation may be mandatorily removed. The limitation may be removed by modifying the page configuration file or an orientation status value in the orientation code corresponding to the page.

For example, in a page configuration file of an Android system, landscape/portrait orientation configuration information of an application may be:

ActivityInfo.SCREEN_ORIENTATION UNSPECIFIED,//−1; or

ActivityInfo.SCREEN_ORIENTATION LANDSCAPE,//0; or

ActivityInfo.SCREEN_ORIENTATION PORTRAIT,//1;

where "unspecified" indicates that the orientation is a default value, and the orientation is selected by the system, and its corresponding status value is −1;

"landscape" indicates landscape orientation display, and its corresponding status value is 0; and "portrait" indicates portrait orientation display, and its corresponding status value is 1.

Therefore, when the terminal obtains the landscape/portrait orientation configuration information of the application, a display orientation of the application that is limited by default may be determined, and the limited display orientation may be modified by modifying corresponding configuration information. For example, for an application that is limited to only landscape orientation display or only portrait orientation display, a display orientation of the application may be selected by the system by means of modification. That is, when the status value is changed to −1, the page display orientation may be freely switched according to the rotation of the terminal. In this way, not only portrait orientation display, but also landscape orientation display can be performed. However, if the application itself does not have a limitation that the page supports only display in a single orientation, the application may adaptively perform portrait orientation display or landscape orientation display according to selection by the terminal.

Figure 3:
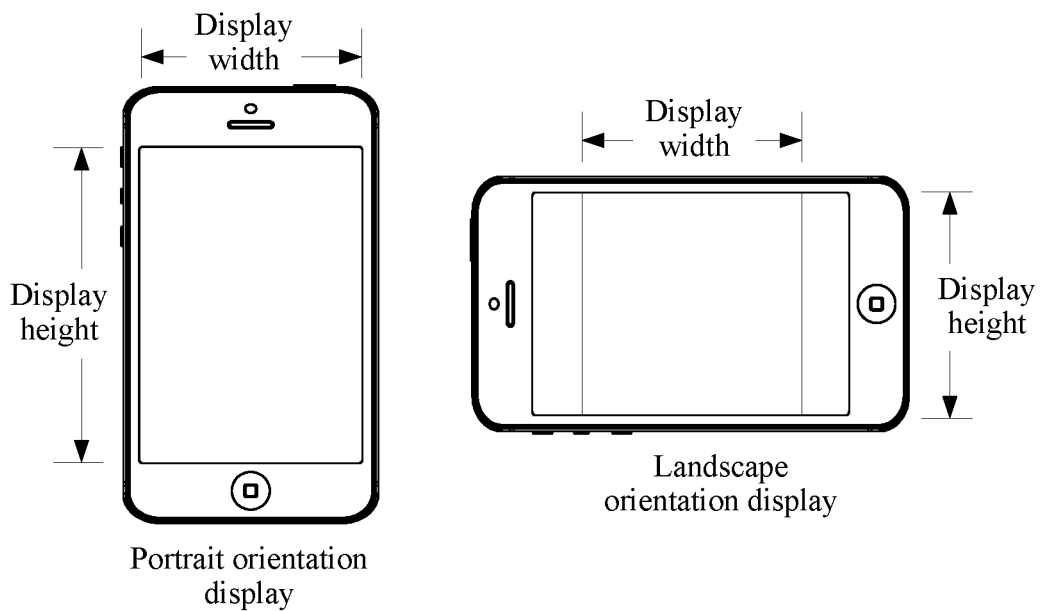
FIG. 3 is a schematic diagram of a page size change when the method in FIG. 2 is used to switch from portrait orientation display to landscape orientation display.
Figure 4:
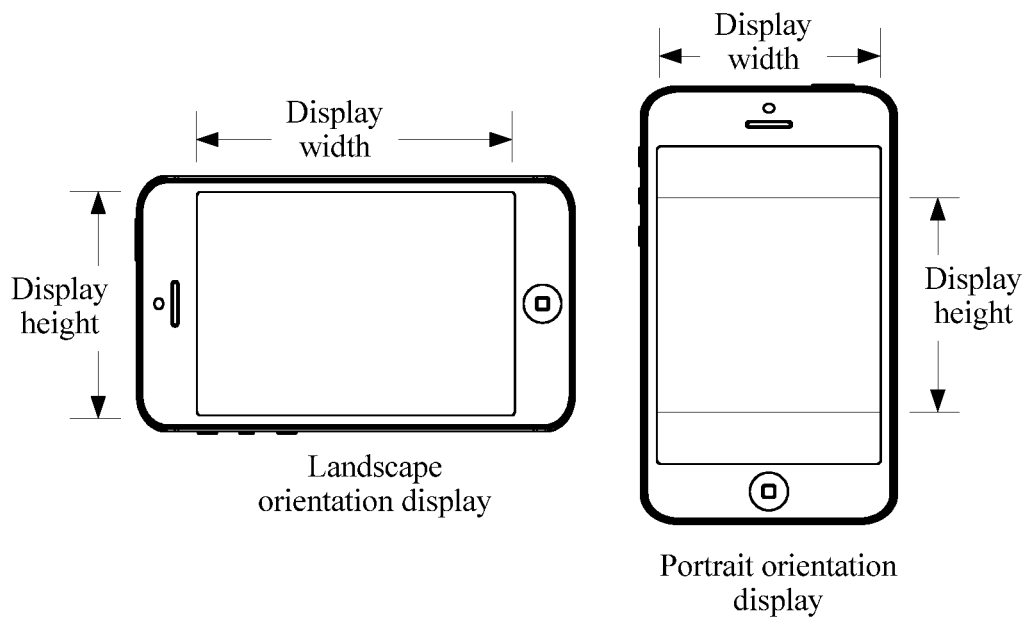
FIG. 4 is a schematic diagram of a page size change when the method in FIG. 2 is used to switch from landscape orientation display to portrait orientation display.

After the landscape/portrait orientation configuration information is modified, the page display size of the application further needs to be modified to ensure a display effect. For example, when the terminal rotates from a portrait screen orientation to a landscape screen orientation, the terminal may configure a page display size when the application is displayed in the landscape orientation according to a portrait orientation display size of the terminal. Optionally, referring to FIG. 3, FIG. 3 is a schematic diagram of a page size change when the method in FIG. 2 is used to switch from portrait orientation display to landscape orientation display. A page display width when the application is displayed in a landscape orientation may be configured as a page display width when the application is displayed in a portrait orientation, and a page display height when the application is displayed in the landscape orientation may be configured to be less than or equal to the page display width when the application is displayed in the portrait orientation. The terminal may first read a height and a width of the page in the portrait orientation display, and then calculate a size in the landscape orientation display according to the foregoing rule. For example, a resolution is used as an example. A relatively common high-definition display page has a resolution of 1920*1080. Therefore, in the portrait orientation display, a display height of the page occupies 1920 pixels, and a display width of the page occupies 1080 pixels. When the page is switched to the landscape orientation, the display width of the page still occupies 1080 pixels, but the display height of the page occupies only 1080 pixels or less than 1080 pixels. Optionally, to fully cover the screen when the display screen is in the landscape orientation, a display height that occupies 1080 pixels is usually used. In this way, it can be ensured that page display precision is not changed, and this avoids a problem that user experience becomes worse because the page becomes rough and fuzzy. In the landscape orientation display, content displayed in a vertical orientation is reduced. Therefore, the user may slide the screen up and down to view the content. A navigation bar, a notification bar, or the like that is always set on the page may still always be set on the top or at the bottom of the page in the landscape orientation display. Certainly, in order that the content displayed in the portrait orientation is not changed after the page is switched to the landscape orientation display, a scaling-down manner may be used to totally display, in the landscape orientation, the content originally displayed in the portrait orientation. Similarly, for switching from the landscape orientation display to the portrait orientation display, refer to FIG. 4. FIG. 4 is a schematic diagram of a page size change when the method in FIG. 2 is used to switch from landscape orientation display to portrait orientation display. The page display width when the application is displayed in the portrait orientation may be configured to be less than or equal to the page display height when the application is displayed in the landscape orientation, and a page display height when the application is displayed in the portrait orientation may be configured as the page display width when the application is displayed in the landscape orientation.

In step S106, optionally, when the application is switched from the portrait orientation display to the landscape orientation display, the application may be displayed in a center or on a right side of the display screen of the terminal. Most users are used to using their right hands. Therefore, the page displayed in the landscape orientation is displayed in the center or on the right side of the display screen of the terminal. This not only accords with a visual habit of the user, but also accords with an operating habit of the user, and makes it convenient for the user to view and use the page displayed in the landscape orientation. When the application is switched from the landscape orientation display to the portrait orientation display, the application may be displayed in the center or at the bottom of the display screen of the terminal. This is convenient for the user to operate the terminal with one hand.

In step S106, in a possible implementation, when the foregoing size or location is used for display, a blank may be left on the display screen regardless of whether the portrait orientation display is switched to the landscape orientation display or the landscape orientation display is switched to the portrait orientation display. If no processing is to be performed, not only a screen hardware resource is wasted, but also a display effect is relatively poor. Therefore, an interface after landscape/portrait orientation switching may be divided into a first display area and a second display area. The application is displayed in the first display area, and a preset function button or a preset application is displayed in the second display area, that is, in a blank area.

Optionally, an application or a function button related to the application may be displayed in the second display area. For example, for some instant messaging applications, the user may need to exchange information with another user, such as sending some pictures or videos. Therefore, a camera application may be related to the application and displayed in the second display area. The user can conveniently tap an icon of the camera application beside a display page of the instant messaging application, so as to start the camera application to shoot and directly send a shot photo or video. For another example, for some applications that are used for learning, such as a document reading application, the user may need to look up some materials at any moment. In this case, a search bar of a search engine may be set in the second display area, so that the user can conveniently enter a key word in the search bar beside the display page of the application, so as to make a search and view a search result. For another example, for some game applications, the user needs to control an orientation and an action of a virtual object. If displayed on the original display page, the application occupies space of the first display area. In this case, an orientation control button and an action control button may be set in the second display area for the user to use. Especially when the application is displayed in the center of the display screen, the orientation control button is displayed in the blank first display area on a left side of the display screen, and the action control button is displayed in the blank first display area on a right side. Certainly, some related share buttons may be displayed in the second display area to share information currently viewed by the user, or some save buttons are set for the user to save the currently viewed information.

Alternatively, an application or a function button that is adapted to all applications is displayed in the second display area. The adapted application or function button may include but is not limited to: a clock, a weather widget, a search bar, and an on-screen keyboard. Display content may be preset by a terminal vendor, or selectable options may be provided for the user to select, or the user may customize the display content. This embodiment of the present invention does not set any limit.

Figure 5:
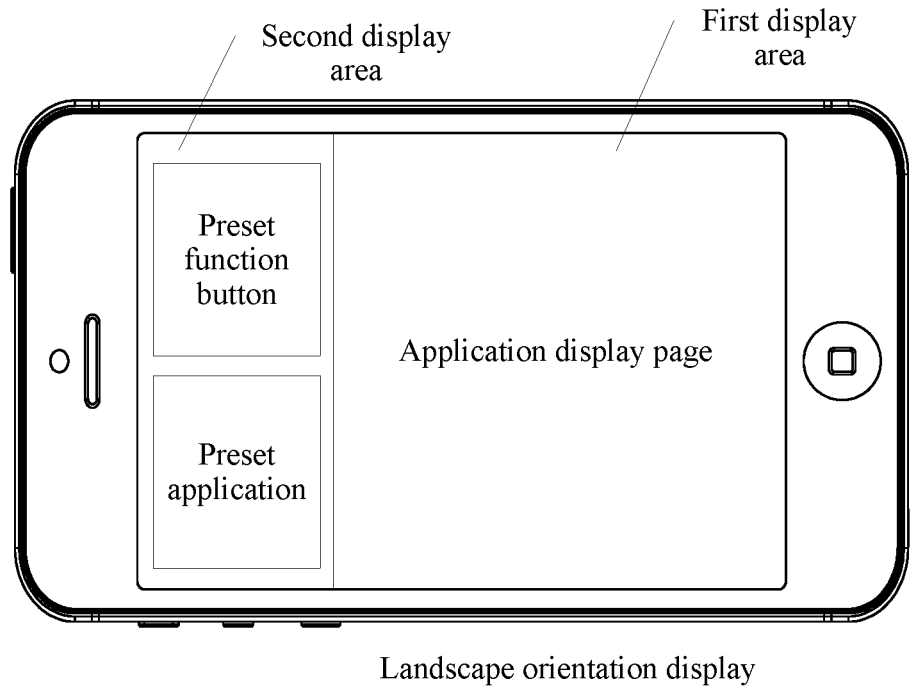
FIG. 5 is a schematic diagram of an interface when the method in FIG. 2 is used for display.
Figure 6:
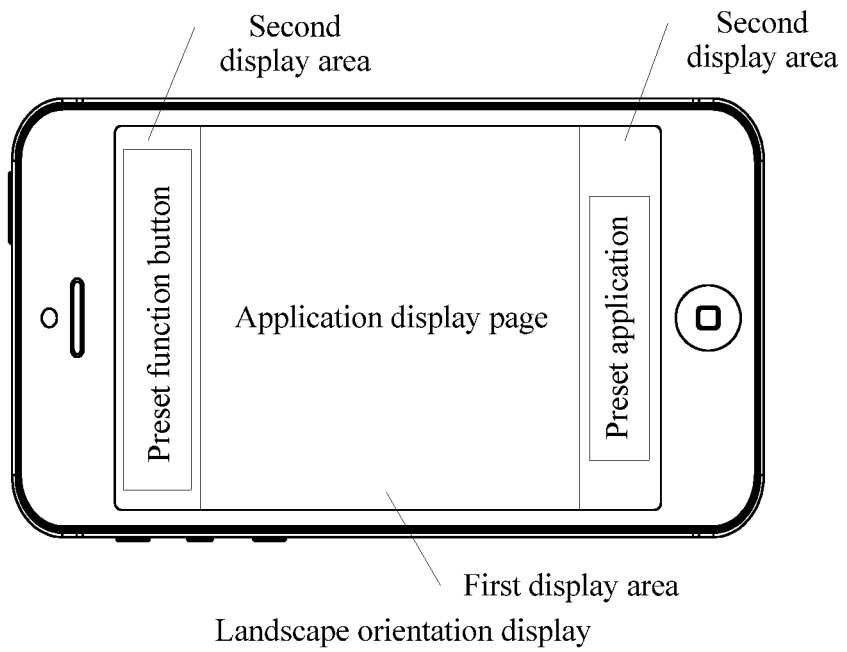
FIG. 6 is another schematic diagram of an interface when the method in FIG. 2 is used for display.
Figure 7:
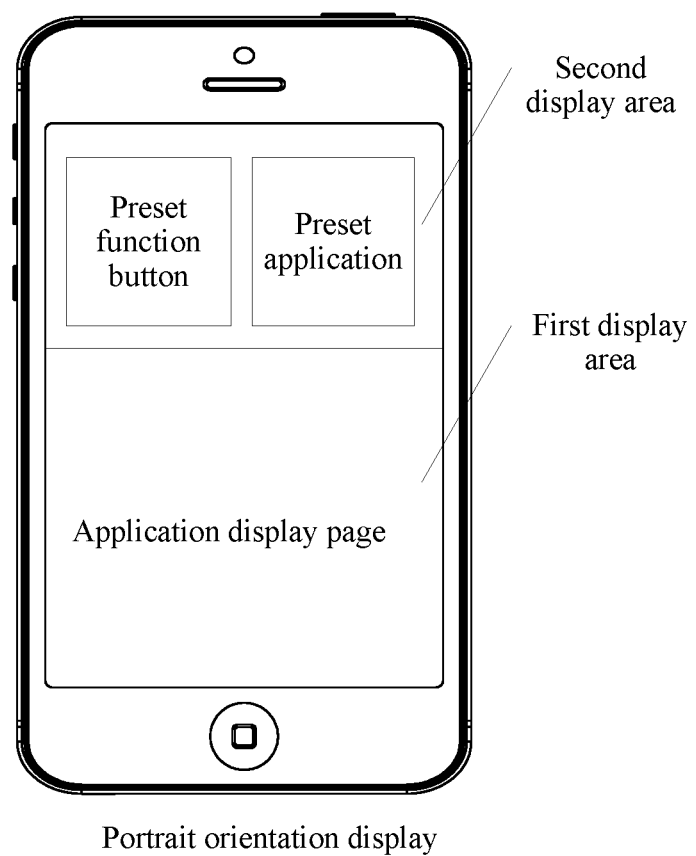
FIG. 7 is still another schematic diagram of an interface when the method in FIG. 2 is used for display.
Figure 8:
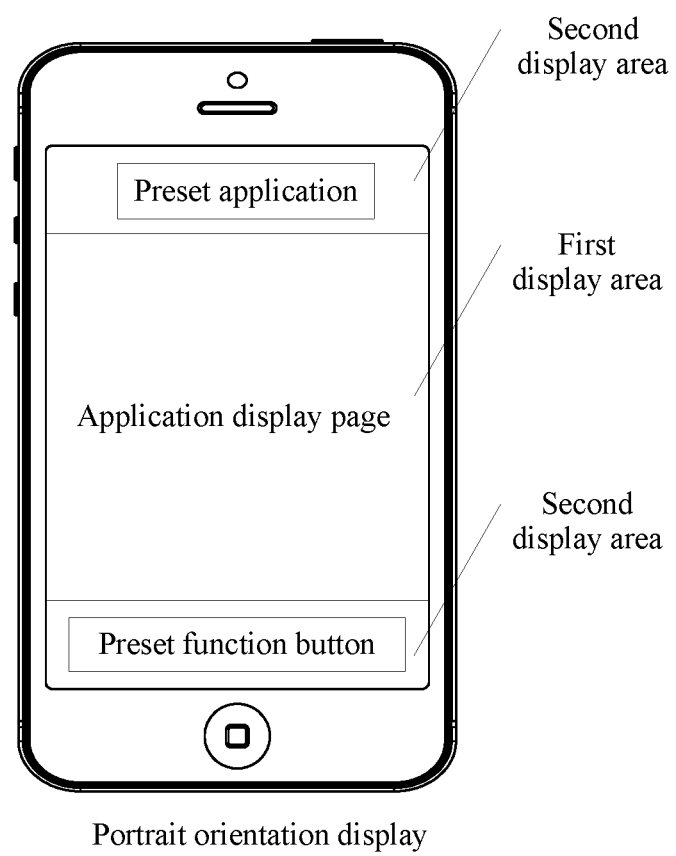
FIG. 8 is yet another schematic diagram of an interface when the method in FIG. 2 is used for display.

For a schematic diagram of a displayed interface, refer to FIG. 5 to FIG. 8. FIG. 5 is a schematic diagram of an interface displayed by using the method in FIG. 2. FIG. 6 is a schematic diagram of another interface displayed by using the method in FIG. 2. FIG. 7 is a schematic diagram of still another interface displayed by using the method in FIG. 2. FIG. 8 is a schematic diagram of still another interface displayed by using the method in FIG. 2.

FIG. 5 and FIG. 6 are schematic diagrams of an interface displayed in a landscape orientation. As shown in FIG. 5, an application display page is located in the first display area on the right side of the display screen, and the preset function button and/or the preset application may be displayed in the second display area on the left side of the display screen. As shown in FIG. 6, the application display page is located in the first display area in the center of the display screen. The preset application may be displayed in the second display area on the left side, and the preset function button may be displayed in the second display area on the right side. FIG. 7 and FIG. 8 are schematic diagrams of an interface displayed in a portrait orientation. As shown in FIG. 7, the application display page is located in the first display area at the bottom of the display screen, and the preset function button and/or the preset application may be displayed in the second display area on the top of the display screen. As shown in FIG. 8, the application display page is located in the first display area in the center of the display screen. The preset application may be displayed in the second display area on the top, and the preset function button may be displayed in the second display area at the bottom. In the interfaces shown in FIG. 5 to FIG. 8, the user may customize selection and a display location of the preset function button or the preset application. This embodiment of the present invention does not set any limit.

A display attribute of a currently displayed application is read, and landscape/portrait orientation configuration information of page display of the application is obtained. When a landscape/portrait orientation switching instruction is received, if the landscape/portrait orientation configuration information sets that a page supports only display in a single orientation, the landscape/portrait orientation configuration information and a page display size of the application are modified, and landscape/portrait orientation switching is performed according to the landscape/portrait orientation switching instruction. The application whose page display size is modified is displayed on an interface obtained after landscape/portrait orientation switching. Therefore, an application that does not support landscape/portrait orientation switching can implement landscape/portrait orientation switching display. Especially when a user uses a terminal with a relatively large screen, landscape orientation display may be implemented according to a demand of the user, and a wider landscape vision is provided for the user. When it is inconvenient for the user to operate the terminal with two hands, portrait orientation display may be implemented according to a demand of the user, and the user can conveniently operate the terminal with one hand. Therefore, a display effect and user experience of the terminal are improved, and applicability and practicability of the terminal are extended. In addition, a preset function button or a preset application is displayed in a second display area obtained after landscape/portrait orientation switching, so that a screen hardware resource of the terminal is fully utilized and more functions for a display page obtained after landscape/portrait orientation switching are provided. This is more convenient for the user to use the terminal, and the applicability and the practicability of the terminal are further improved.

Figure 9:
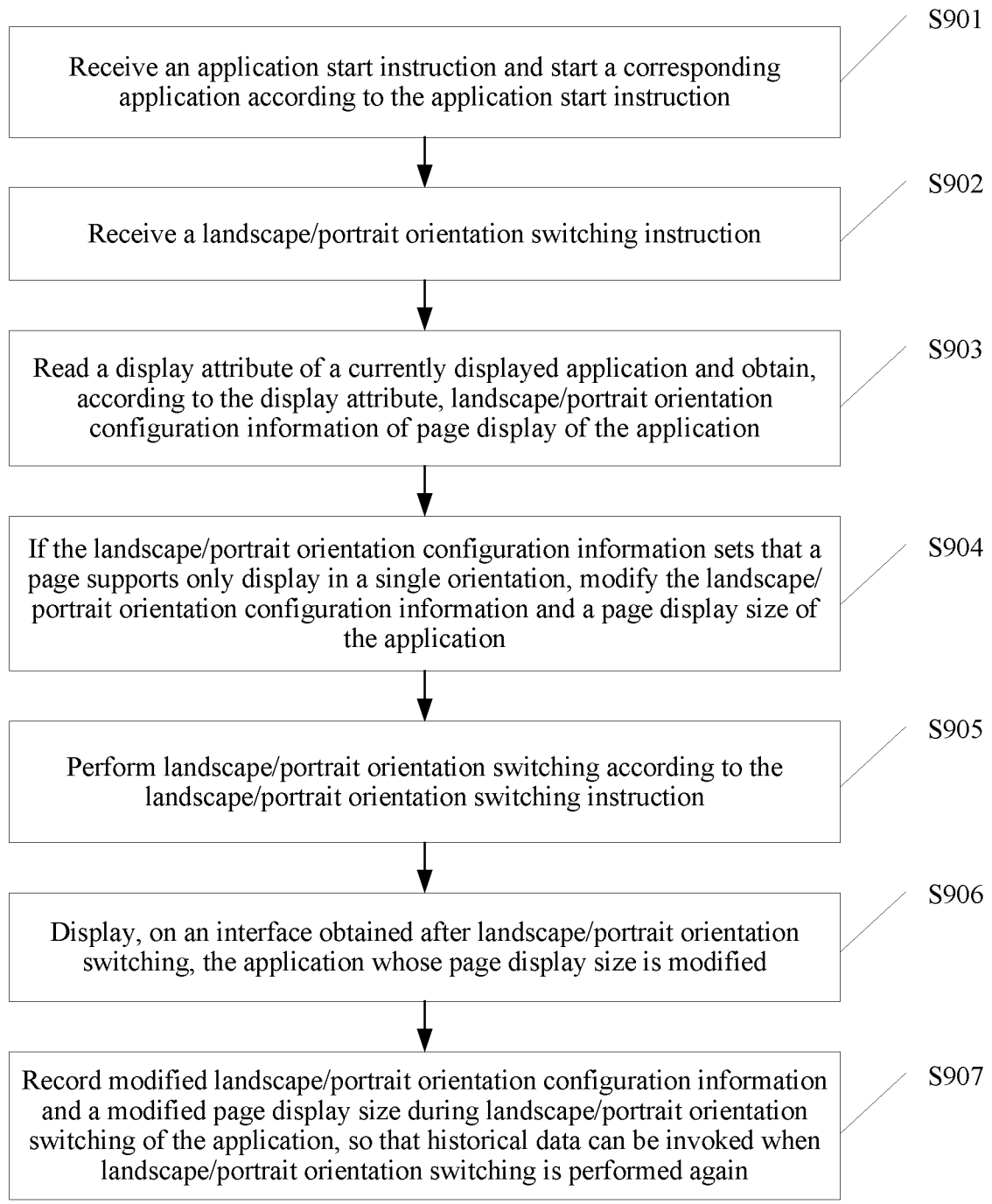
FIG. 9 is a schematic flowchart of another display method according to an embodiment of the present invention.

Referring to FIG. 9, FIG. 9 is a schematic flowchart of another display method according to an embodiment of the present invention. In this embodiment, steps S901-S906 are the same as steps S201-S206 shown in FIG. 2. After step S906 same as step S206, the method further includes:

S807. Record modified landscape/portrait orientation configuration information and a modified page display size during landscape/portrait orientation switching of the application, so that the landscape/portrait orientation configuration information and the page display size can be invoked when landscape/portrait orientation switching is performed again. In step S907, after the terminal obtains the landscape/ portrait orientation configuration information of page display of the application and determines that the application sets that a page supports only display in a single orientation, the application, the modified landscape/portrait orientation configuration information, and the modified page display size may be recorded and stored. In this way, when landscape/portrait orientation switching needs to be performed on the application next time, historical data may be directly invoked to perform landscape/portrait orientation switching. Therefore, this improves switching efficiency when a display page of the application is switched along with a landscape/portrait orientation.

In this embodiment, the modified landscape/portrait orientation configuration information and the page display size of the application are recorded, and the recorded historical data is directly invoked when a terminal performs landscape/portrait orientation switching. This can avoid inefficient processing that the landscape/portrait orientation configuration information and the page display size need to be modified once every time, and can increase a response speed of landscape/portrait orientation switching.

Figure 10:
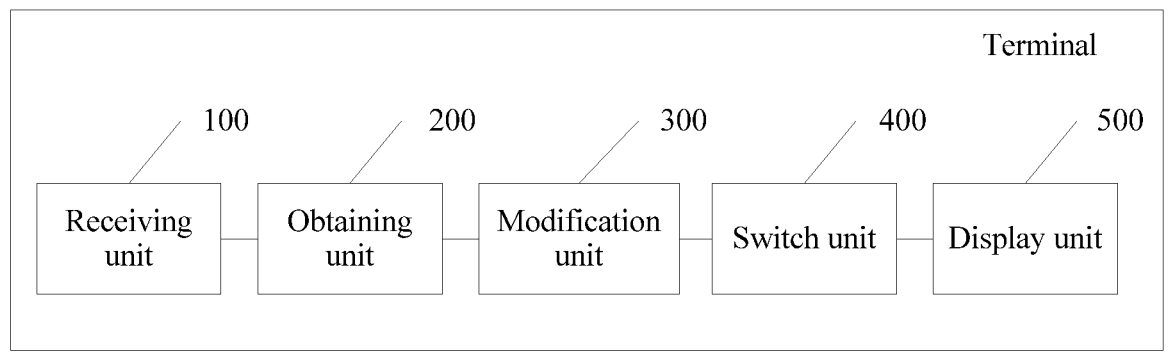
FIG. 10 is a schematic diagram of composition of a terminal according to an embodiment of the present invention.

Referring to FIG. 10, FIG. 10 is a schematic diagram of composition of a terminal according to an embodiment of the present invention. In this embodiment, the terminal includes:

a receiving unit 100, configured to receive a landscape/portrait orientation switching instruction;

a reading unit 200, configured to read a display attribute of the application and obtain, according to the display attribute, landscape/portrait orientation configuration information of page display of the application;

a modification unit 300, configured to: if the landscape/portrait orientation configuration information sets that a page supports only display in a single orientation, modify the landscape/portrait orientation configuration information and a page display size of the application;

a switch unit 400, configured to perform landscape/portrait orientation switching according to the landscape/portrait orientation switching instruction; and a display unit 500, configured to display, on an interface obtained after landscape/portrait orientation switching, the application whose page display size is modified.

Optionally, the interface obtained after landscape/portrait orientation switching includes a first display area and a second display area, and the display unit 500 is further configured to:

display the application in the first display area; and display a preset function button or a preset application in the second display area.

Optionally, when the application is switched from portrait orientation display to landscape orientation display, the modification unit 300 is specifically configured to:

configure a page display width when the application is displayed in a landscape orientation as a page display width when the application is displayed in a portrait orientation and configure a page display height when the application is displayed in the landscape orientation to be less than or equal to the page display width when the application is displayed in the portrait orientation.

Optionally, when the application is switched from the portrait orientation display to the landscape orientation display, the display unit 500 is further configured to display the application in a center or on a right side of a display screen of the terminal.

Optionally, the display unit 500 is further specifically configured to:

display, in the second display area, an application or a function button related to the application; or display, in the second display area, an application or a function button that is adapted to all applications.

Figure 11:
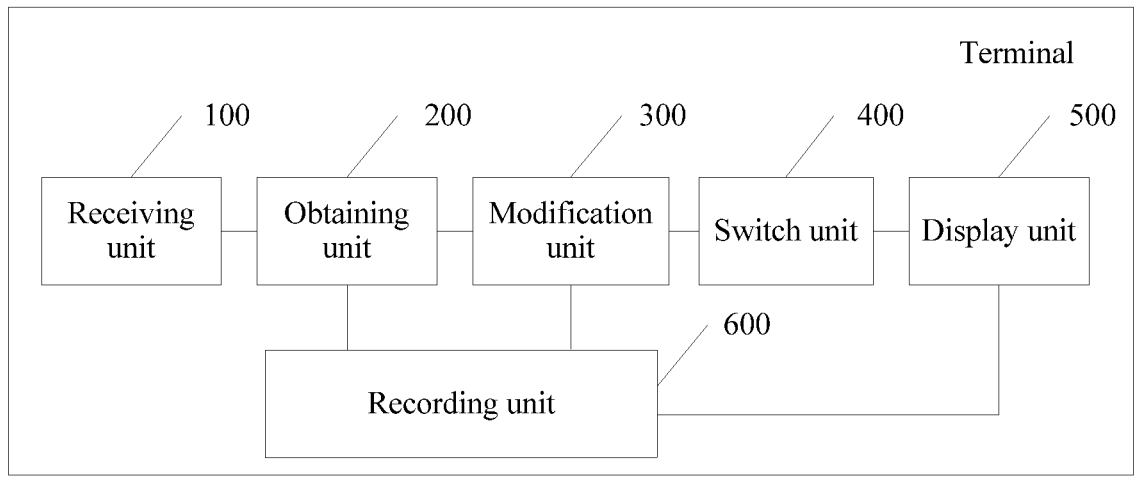
FIG. 11 is a schematic diagram of composition of another terminal according to an embodiment of the present invention.

Referring to FIG. 11, FIG. 11 is a schematic diagram of composition of another terminal according to an embodiment of the present invention. In this embodiment of the present invention, compared with the embodiment shown in FIG. 10, the terminal further includes:

a recording unit 600, configured to record modified landscape/portrait orientation configuration information and a modified page display size during landscape/portrait orientation switching of the application, so that the display unit 600 can invoke the landscape/portrait orientation configuration information and the page display size when landscape/portrait orientation switching is performed again.

It should be noted that the foregoing receiving unit 100, reading unit 200, modification unit 300, switch unit 400, display unit 500, and recording unit 600 may exist independently, or may be disposed in an integrated manner. In addition, in the foregoing embodiment of the terminal, the receiving unit 100, the reading unit 200, the modification unit 300, the switch unit 400, the display unit 500, or the recording unit 600 may be disposed alone independent of a processor of the terminal in a form of hardware, and a disposal form may be a microprocessor form; or may be built into a processor of the terminal in a form of hardware, or may be stored into a memory of the terminal in a form of software, so that the processor of the terminal can invoke and execute operations corresponding to the foregoing receiving unit 100, reading unit 200, modification unit 300, switch unit 400, display unit 500, and recording unit 600. The display unit 500 may be a display screen of the terminal, and the receiving unit 100 may be an interface circuit of the terminal.

For example, in a second embodiment (the embodiment shown in FIG. 11) of the terminal according to the present invention, the modification unit 300 may be the processor of the terminal. Functions of the receiving unit 100, the reading unit 200, the switch unit 400, the display unit 500, and the recording unit 600 may be embedded into the processor, may be disposed alone independent of the processor, or may be stored into the memory in a form of software, and the processor invokes and implements the functions. The foregoing processor may be a central processing unit (CPU), a microprocessor, a single-chip microcomputer, or the like. The display unit 500 may be used as the display screen of the terminal, is connected to the processor of the terminal by using the interface circuit, and performs display according to an instruction of the processor.

Figure 12:
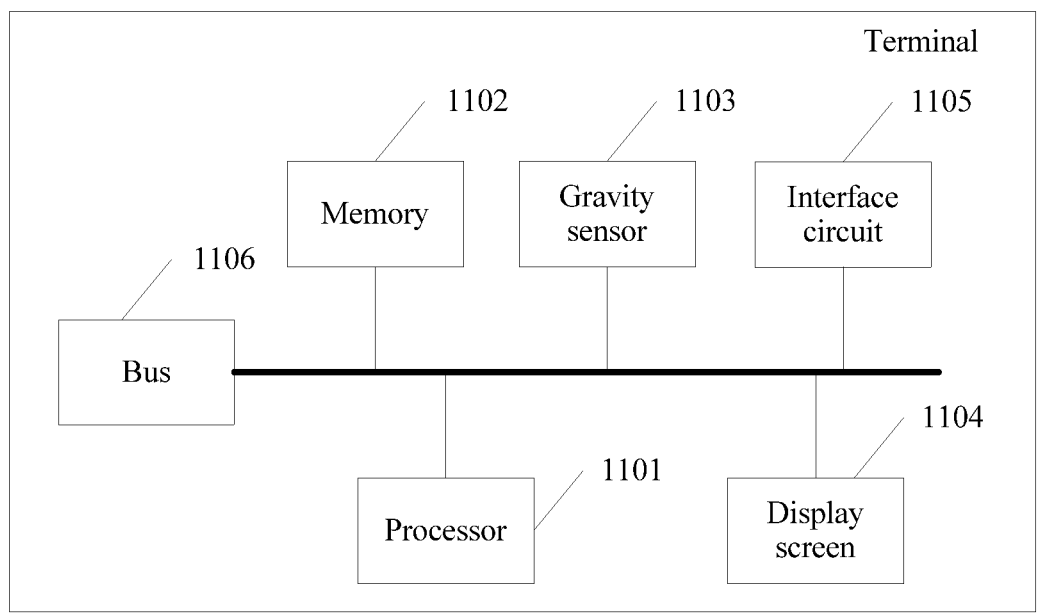
FIG. 12 is a schematic diagram of composition of still another terminal according to an embodiment of the present invention.

Referring to FIG. 12, FIG. 12 is a schematic diagram of composition of still another terminal according to an embodiment of the present invention. In this embodiment of the present invention, the terminal includes:

a processor 1101, a memory 1102, a gravity sensor 1103, a display screen 1104, an interface circuit 1105, and a bus 1106, where the processor 1101, the memory 1102, the gravity sensor 1103, the display screen 1104, and the interface circuit 1105 are connected and communicate with each other by using the bus 1106, the memory 1102 is configured to store a group of program code, and the processor 1101 is configured to invoke the program code stored in the memory to perform the following operations:

receiving a landscape/portrait orientation switching instruction by using the gravity sensor 1103 or the interface circuit 1105;

reading a display attribute of a currently displayed application and obtaining, according to the display attribute, landscape/portrait orientation configuration information of page display of the application;

if the landscape/portrait orientation configuration information sets that a page supports only display in a single orientation, modifying the landscape/portrait orientation configuration information and a page display size of the application;

performing landscape/portrait orientation switching according to the landscape/portrait orientation switching instruction; and instructing the display screen 1104 to display, on an interface obtained after landscape/portrait orientation switching, the application whose page display size is modified.

Optionally, the interface obtained after landscape/portrait orientation switching includes a first display area and a second display area, and the processor 1101 is further configured to:

instruct the display screen 1104 to display the application in the first display area; and instruct the display screen 1104 to display a preset function button or a preset application in the second display area.

Optionally, the processor 1101 is further configured to:

record, by using the memory 1102, modified landscape/portrait orientation configuration information and a modified page display size during landscape/portrait orientation switching of the application, so that the landscape/portrait orientation configuration information and the page display size can be invoked when landscape/portrait orientation switching is performed again.

Optionally, when the application is switched from portrait orientation display to landscape orientation display, the processor 1101 is specifically configured to:

configure a page display width when the application is displayed in a landscape orientation as a page display width when the application is displayed in a portrait orientation and configure a page display height when the application is displayed in the landscape orientation to be less than or equal to the page display width when the application is displayed in the portrait orientation.

Optionally, when the application is switched from the portrait orientation display to the landscape orientation display, the processor 1101 is specifically configured to:

instruct the display screen 1104 to display the application in a center or on a right side of the display screen 1104 of the terminal.

Optionally, the processor 1101 is specifically configured to:

instruct the display screen 1104 to display, in the second display area, an application or a function button related to the application; or instruct the display screen 1104 to display, in the second display area, an application or a function button that is adapted to all applications.

It should be noted that the processor 1101 herein may be one processor or may be a collective term of multiple processing elements. For example, the processor may be a central processing unit (Central Processing Unit, CPU), an application specific integrated circuit (Application Specific Integrated Circuit, ASIC), or one or more integrated circuits configured to implement the embodiments of the present invention, for example, one or more microprocessors (digital signal processor, DSP) or one or more field programmable gate arrays (Field Programmable Gate Array, FPGA).

The memory 1102 may be one memory apparatus or may be a collective term of multiple memory elements, and is configured to store executable program code, or a parameter, data, or the like required by an access network device for running. In addition, the memory 1103 may include a random access memory (RAM) and may further include a nonvolatile memory (non-volatile memory), such as a magnetic disk storage or a flash (Flash).

The bus 1106 may be an industry standard architecture (Industry Standard Architecture, ISA) bus, a peripheral component interconnect (Peripheral Component, PCI) bus, an extended industry standard architecture (Extended Industry Standard Architecture, EISA) bus, or the like. The bus 11054 may be categorized into an address bus, a data bus, a control bus, and the like. For ease of illustration, only one bold line is used in FIG. 5 to represent the bus. However, this does not mean that there is only one bus or only one type of bus.

It should be noted that the embodiments in this specification are all described in a progressive manner, each embodiment focuses on a difference from other embodiments, and for same or similar parts in the embodiments, reference may be made to these embodiments. An apparatus embodiment is basically similar to a method embodiment, and therefore is described briefly; for related parts, reference may be made to partial descriptions in the method embodiment.

According to the descriptions of the foregoing embodiments, the present invention has the following advantages:

The display attribute of the application is read, and the landscape/portrait orientation configuration information of page display of the application is obtained. When the landscape/portrait orientation switching instruction is received, if the landscape/portrait orientation configuration information sets that the page supports only display in a single orientation, the landscape/portrait orientation configuration information and a page display size of the application are modified, and landscape/portrait orientation switching is performed according to the landscape/portrait orientation switching instruction. The application whose page display size is modified is displayed on an interface obtained after landscape/portrait orientation switching. Therefore, an application that does not support landscape/portrait orientation switching can implement landscape/portrait orientation switching display. Especially when a user uses a terminal with a relatively large screen, landscape orientation display may be implemented according to a demand of the user, and a wider landscape vision is provided for the user. When it is inconvenient for the user to operate the terminal with two hands, portrait orientation display may be implemented according to a demand of the user, and the user can conveniently operate the terminal with one hand. Therefore, a display effect and user experience of the terminal are improved, and applicability and practicability of the terminal are extended. In addition, a preset function button or a preset application is displayed in a second display area obtained after landscape/portrait orientation switching, so that a screen hardware resource of the terminal is fully utilized and more functions for a display page obtained after landscape/portrait orientation switching are provided. This is more convenient for the user to use the terminal, and the applicability and the practicability of the terminal are further improved.

A person of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

The foregoing describes in detail a display method and a terminal provided in the embodiments of the present invention. In this specification, specific examples are used to describe the principle and implementations of the present invention, and the description of the embodiments is only intended to help understand the method and core idea of the present invention. Meanwhile, a person of ordinary skill in the art may, based on the idea of the present invention, make modifications with respect to the specific implementations and the application scope. Therefore, the content of this specification shall not be construed as a limitation to the present invention.

What is claimed is:

1. A method, comprising:
   receiving, by a terminal, an instruction for switching a display orientation of a screen of the terminal from a first display orientation to a second display orientation;
   obtaining, by the terminal, display orientation configuration information of a page display of an application currently displayed on the screen comprising one or more display elements, wherein the configuration information includes a limitation in an application page configuration file that the page display of the application only supports a first display orientation;
   modifying, by the terminal, the display orientation configuration information and a page display size of the application wherein the modifying includes removing the limitation that the page of the application only supports a first display orientation in the application page configuration file;
   switching, by the terminal, the display orientation of the screen from the first display orientation to the second display orientation according to the instruction;
   after the display orientation of the screen is switched from the first display orientation to the second display orientation, displaying, by the terminal, the application with the modified page display size in the second display orientation on the screen of the terminal in a first display area located in a portion of the display associated with a handedness of a user; and
   displaying, in a second display area comprising a portion of the terminal screen uncovered by the first display area, at least one of a preset function button or preset application, wherein the at least one the preset function button or preset application is set by a terminal vendor or customized by the user.

2. The method according to claim 1, further comprising:
   recording the modified display orientation configuration information of the application and the modified page display size of the application; and
   when the display orientation of the screen is subsequently switched from the first display orientation to the second display orientation again, invoking the modified display orientation configuration information and the modified page display size.

3. The method according to claim 1, wherein displaying the preset function button or the preset application in the second display area comprises:
   displaying, in the second display area, an application or a function button related to the application.

4. The method according to claim 1, is wherein displaying the preset function button or the preset application in the second display area comprises:
   displaying, in the second display area, an application or a function button that is adapted to all applications.

5. The method according to claim 1, further comprising:
   recording the modified display orientation configuration information and the modified page display size; and
   invoking the modified display orientation configuration information and the modified page display size when the display orientation of the screen is subsequently switched from the first display orientation to the second display orientation again.

6. The method according to claim 1, wherein the first display orientation is a portrait orientation and the second display orientation is a landscape orientation.

7. The method according to claim 6, wherein modifying the page display size of the application comprises:
   configuring a page display width when the application is displayed in the landscape orientation as a page display width when the application is displayed in the portrait orientation; and
   configuring a page display height when the application is displayed in the landscape orientation to be less than or equal to the page display height when the application is displayed in the portrait orientation.

8. The method according to claim 1, wherein the first display orientation is a landscape orientation and the second display orientation is a portrait orientation.

9. The method according to claim 8, wherein modifying the page display size of the application comprises:
   configuring a page display height when the application is displayed in the portrait orientation as a page display height when the application is displayed in the landscape orientation; and
   configuring a page display width when the application is displayed in the portrait orientation to be less than or equal to the page display width when the application is displayed in the landscape orientation.

10. A terminal, comprising:
    a processor;
    a non-transitory memory;
    a display screen; and
    a bus,
    wherein the processor, the memory, and the display screen are coupled with each other using the bus,
    wherein the non-transitory memory is configured to store computer executable instructions,
    wherein the processor is configured to execute the computer executable instructions to:
      receive, using an input device, an orientation instruction for switching a display orientation of the display screen from a first display orientation to a second display orientation;
      obtain display orientation configuration information of a page display of an application currently displayed on the display screen comprising one or more display elements, wherein the configuration information includes a limitation in an application page configuration file that the page display of the application only supports a first display orientation;
      modify the display orientation configuration information and a page display size of the application, comprising removing the limitation that the page of the application only supports a first display orientation in the application page configuration file;
      switch the display orientation of the display screen from the first display orientation to the second display orientation according to the orientation instruction; and after the display orientation of the display screen is switched from the first display orientation to the second display orientation, instruct the display screen to display the application with the modified page display size in the second display orientation on the display screen in a first display area located in a portion of the display associated with a handedness of a user; and display, in a second display area comprising a portion of the terminal screen uncovered by the first display area, at least one of a preset function button or preset application, wherein the at least one the preset function button or preset application is set by a terminal vendor or customized by the user.

11. The terminal according to claim 10, wherein the processor is further configured to:

record the modified display orientation configuration information and the modified page display size; and when the display orientation of the display screen is subsequently changed from the first display orientation to the second display orientation again, invoke the modified display orientation configuration information and the modified page display size.

12. The terminal according to claim 10, wherein the processor is configured to:

instruct the display screen to display, in the second display area, an application or a function button that is adapted to all applications.

13. The terminal according to claim 10, wherein the processor is configured to:

instruct the display screen to display, in the second display area, an application or a function button related to the application.

14. The terminal according to claim 10, wherein the processor is further configured to:

record the modified display orientation configuration information and the modified page display size; and when the display orientation of the display screen is subsequently changed from the first display orientation to the second display orientation again, invoke the modified display orientation configuration information and the modified page display size.

15. The terminal according to claim 10, wherein the first display orientation is a portrait orientation and the second display orientation is a landscape orientation.

16. The terminal according to claim 15, wherein the processor is configured to:

configure a page display width when the application is displayed in a landscape orientation as a page display width when the application is displayed in a portrait orientation; and configure a page display height when the application is displayed in the landscape orientation to be less than or equal to the page display height when the application is displayed in the portrait orientation.

17. The terminal according to claim 10, wherein the first display orientation is a landscape orientation and the second display orientation is a portrait orientation.

18. The terminal according to claim 17, wherein the processor is configured to:

configure a page display height when the application is displayed in a portrait orientation as a page display height when the application is displayed in a landscape orientation; and configure a page display width when the application is displayed in the portrait orientation to be less than or equal to the page display width when the application is displayed in the landscape orientation.

* * * * *